United States Patent
Wu et al.

(10) Patent No.: US 11,762,587 B2
(45) Date of Patent: Sep. 19, 2023

(54) METHOD AND MEMORY DEVICE FOR ATOMIC PROCESSING OF FUSED COMMANDS

(71) Applicant: Samsung Electronics Co., Ltd., Gyeonggi-do (KR)

(72) Inventors: Chun-chu Chen-Jhy Archie Wu, San Carlos, CA (US); Daniel Lee Helmick, Broomfield, CO (US); Fnu Vikram Singh, Fremont, CA (US); Syed Kaiser, San Ramon, CA (US); Vasili Zhdankin, Prior Lake, MN (US); Yong Yang, Milpitas, CA (US)

(73) Assignee: Samsung Electronics Co., Ltd (KR)

( * ) Notice: Subject to any disclaimer, the term of this patent is extended or adjusted under 35 U.S.C. 154(b) by 99 days.

(21) Appl. No.: 17/381,795

(22) Filed: Jul. 21, 2021

(65) Prior Publication Data
US 2022/0357887 A1    Nov. 10, 2022

Related U.S. Application Data

(60) Provisional application No. 63/184,499, filed on May 5, 2021.

(51) Int. Cl.
*G06F 3/06* (2006.01)
*G06F 12/02* (2006.01)
*G06F 13/16* (2006.01)

(52) U.S. Cl.
CPC .......... *G06F 3/0659* (2013.01); *G06F 3/0604* (2013.01); *G06F 3/0656* (2013.01); *G06F 3/0679* (2013.01); *G06F 12/0246* (2013.01); *G06F 13/1621* (2013.01); *G06F 13/1626* (2013.01); *G06F 13/1642* (2013.01)

(58) Field of Classification Search
None
See application file for complete search history.

(56) References Cited

U.S. PATENT DOCUMENTS

| | | | |
|---|---|---|---|
| 6,546,461 | B1 | 4/2003 | Au et al. |
| 6,643,746 | B1 | 11/2003 | Bouquet |
| 7,013,383 | B2 | 3/2006 | Shelor |
| 7,873,776 | B2 | 1/2011 | Hetherington et al. |

(Continued)

OTHER PUBLICATIONS

Shao et al. "A Burst Scheduling Access Reordering Mechanism." Feb. 2007. IEEE. HPCA 2007. pp. 285-294.*

(Continued)

*Primary Examiner* — Nathan Sadler
(74) *Attorney, Agent, or Firm* — The Farrell Law Firm, P.C.

(57) ABSTRACT

A method and a memory device are provided. A controller of the memory device retrieves a first command burst from a host memory. The first command burst includes a sequence of one or more commands from a first submission queue. The controller identifies that at least one command in the first command burst is at least one first fused command of a first set of fused commands. The first set of fused commands is to be processed atomically in the memory device, and a remainder of the first set of fused commands is on the first submission queue. The controller stores at least an identifier of the at least one first fused command in a set-aside buffer of the memory device.

20 Claims, 9 Drawing Sheets

(56) References Cited

U.S. PATENT DOCUMENTS

| | | |
|---|---|---|
| 9,208,108 B2 | 12/2015 | Vyshetsky et al. |
| 9,606,803 B2 | 3/2017 | Anderson et al. |
| 9,672,165 B1 | 6/2017 | Satish et al. |
| 9,875,182 B1 | 1/2018 | Wallace et al. |
| 9,927,983 B2 | 3/2018 | Benisty et al. |
| 10,176,147 B2 | 1/2019 | Samadi et al. |
| 10,466,903 B2 | 11/2019 | Benisty et al. |
| 10,621,689 B1 | 4/2020 | Maiyuran et al. |
| 10,642,498 B2 | 5/2020 | Benisty et al. |
| 10,725,835 B2 | 7/2020 | Benisty |
| 10,949,121 B2 | 3/2021 | Takano |
| 2005/0102456 A1 | 5/2005 | Kang |
| 2018/0285073 A1* | 10/2018 | Fukuchi .................. G06F 5/10 |
| 2019/0278523 A1 | 9/2019 | Benisty |
| 2020/0065244 A1 | 2/2020 | Sanghi et al. |
| 2020/0073586 A1 | 3/2020 | Kurata et al. |
| 2020/0310883 A1 | 10/2020 | Valerio et al. |
| 2021/0073995 A1 | 3/2021 | Yang et al. |

OTHER PUBLICATIONS

Nvmexpress: "NVM Express Revision 1.2.1", XP055749076, Jun. 5, 2016, 217 pages.
European Search Report dated Sep. 26, 2022 issued in counterpart application No. 22170912.4-1224, 8 pages.

* cited by examiner

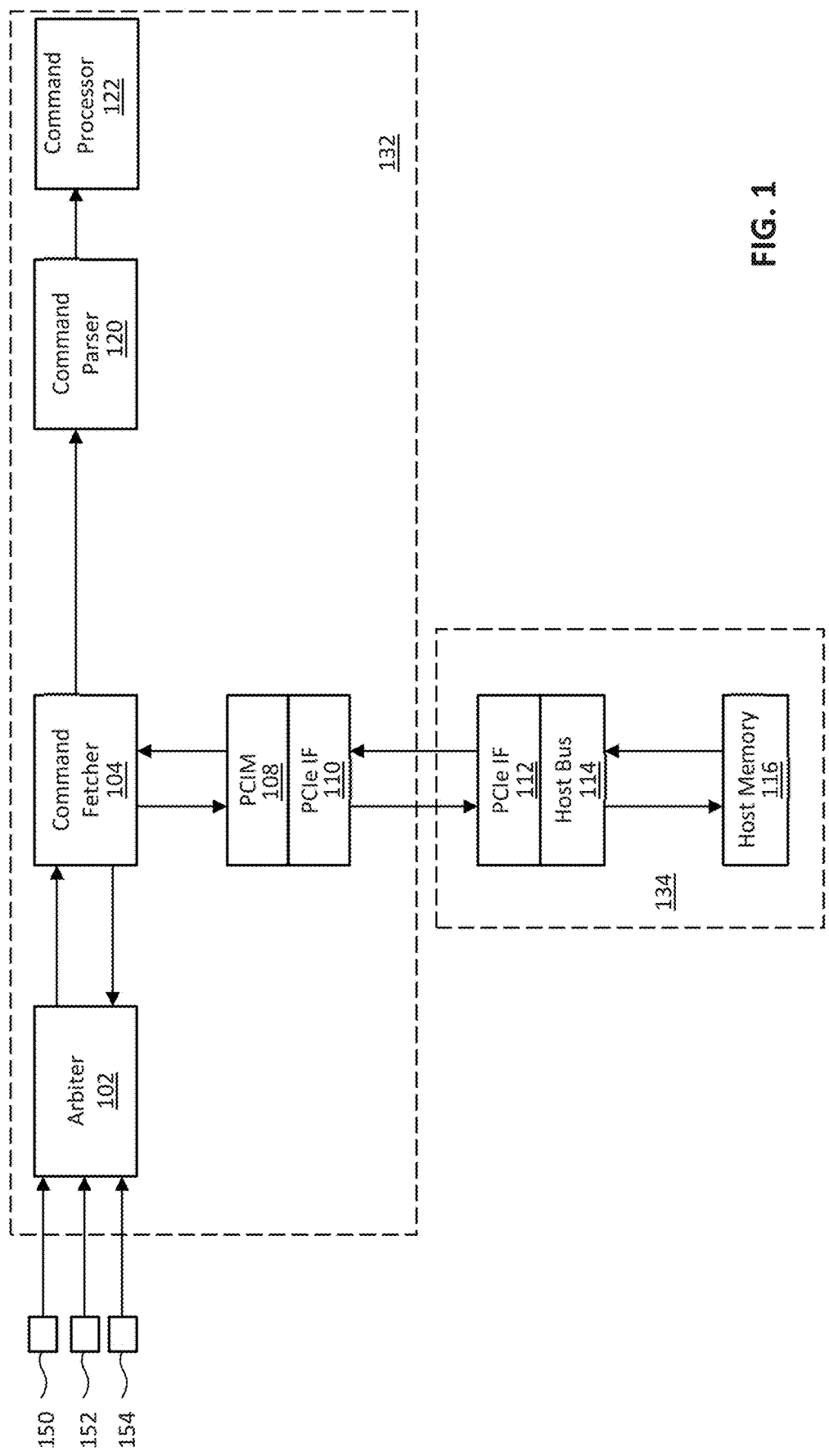

METHOD AND MEMORY DEVICE FOR ATOMIC PROCESSING OF FUSED COMMANDS

PRIORITY

This application is based on and claims priority under 35 U.S.C. § 119(e) to U.S. Provisional Patent Application Ser. No. 63/184,499, filed on May 5, 2021, the entire contents of which are incorporated herein by reference.

TECHNICAL AREA

The present disclosure relates generally to memory devices that process fused commands, and more particularly, to a method and memory device that processes split fused commands requested in bursts from submission queues.

BACKGROUND

Non-volatile memory express (NVMe) is a storage interface for solid state drives (SSDs) on a peripheral component interconnect express (PCIe) bus. The interface between a host and the SSD is based on a series of paired submission queues (SQs) and completion queues (CQs) that are built by a drive (running on the host) and shared between the drive and an NVMe device. The SQs and CQs are used for communication between the drive and the NVMe device.

Upon placement of new commands on an SQ, the host informs the NVMe device by writing a new tail pointer to a hardware SQ doorbell register of the device. The NVMe device signals to the host that it has started work on a particular SQ entry or group of SQ entries by moving the head pointer for the same SQ past the SQ entries that have started progress in the NVMe device. When the head pointer and tail pointer in the SQ doorbell register bear different values, it represents that one or more command entries are in the SQ, and therefore, it infers an arbitration request from the SQ.

When the NVMe device completes a command, it puts an entry on a CQ (previously associated with the SQ from which the command was retrieved), updates the head pointer to a hardware CQ doorbell register, and generates an interrupt. After the host fetches and completes the processing of a group of CQ entries, it signals this to the NVMe device by updating the head pointer of the CQ doorbell register. The NVMe device updates the tail pointer to a hardware CQ doorbell register. The host will be able to read the entries on the CQ to determine the work that has been completed. After parsing the entries on the CQ, the host moves the CQ head doorbell pointer to inform the device that it received the completion statuses for those commands.

Commands that are provided to an SQ may include a set of fused commands, which includes fused commands that are intended to be processed atomically (i.e., back-to-back) in the NVMe device. Thus, the fused commands are required to be sequentially provided to the same SQ. Specifically, no other command exists between the first and second fused commands on the given SQ. Non-fused commands that are sequentially input from the host do not need to be processed in order. Further, non-fused commands and sets of fused commands that are sequentially input from the host do not need to be processed in order. Only those fused commands from the same set of fused commands are required to be processed in order without other commands therebetween.

Commands may be pulled from a given SQ in bursts of one or more commands. Therefore, pairs of fused commands may be split into different bursts resulting in commands from one or more other SQs being fetched between the different bursts. When fused commands are split in this manner, the NVMe device ceases retrieval and processing of other commands fetch until the fused commands are received and atomically processed, slowing operation of the drive.

SUMMARY

According to an embodiment, a method of a memory device is provided. A controller of the memory device retrieves a first command burst from a host memory. The first command burst includes a sequence of one or more commands from a first submission queue. The controller identifies that at least one command in the first command burst is at least one first fused command of a first set of fused commands The first set of fused commands are to be processed atomically in the memory device, and a remainder of the first sets of fused commands is on the first submission queue. The controller stores at least an identifier of the at least one first fused command in a set-aside buffer of the memory device.

According to an embodiment, a memory device is provided that includes a controller having an arbiter, a command fetcher connected to the arbiter, a set-aside buffer, a command parser, and a command processor. The controller is configured to retrieve a first command burst from a host memory. The first command burst includes a sequence of one or more commands from a first submission queue. The controller is also configured to identify that at least one command in the first command burst is at least one first fused command of a first set of fused commands. The first set of fused commands is to be processed atomically in the memory device, and a remainder of the first set of fused commands is on the first submission queue. The controller is further configured to store at least an identifier of the at least one first fused command in the set-aside buffer.

According to an embodiment, a memory device is provided that includes a controller having an arbiter, a command fetcher connected to the arbiter, a set-aside buffer, a command parser, and a command processor. The controller is configured to retrieve a first command burst from a host memory. The first command burst includes a sequence of commands from a first submission queue. The controller is also configured to identify that a last command in the first command burst is a first fused command of a pair of fused commands. The pair of fused commands includes the first fused command and a second fused command that are to be processed atomically in the memory device. The controller is further configured to store the first fused command on the set-aside buffer, and retrieve a second command burst from the host memory. The controller is configured to determine whether a first command of the second command burst is the second fused command of the pair of fused commands. The controller is also configured to atomically process the pair of fused commands in response to determining that the first command of the second command burst is the second fused command of the pair of fused commands.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 1 is a diagram illustrating a memory device.

DETAILED DESCRIPTION

Figure 2A:
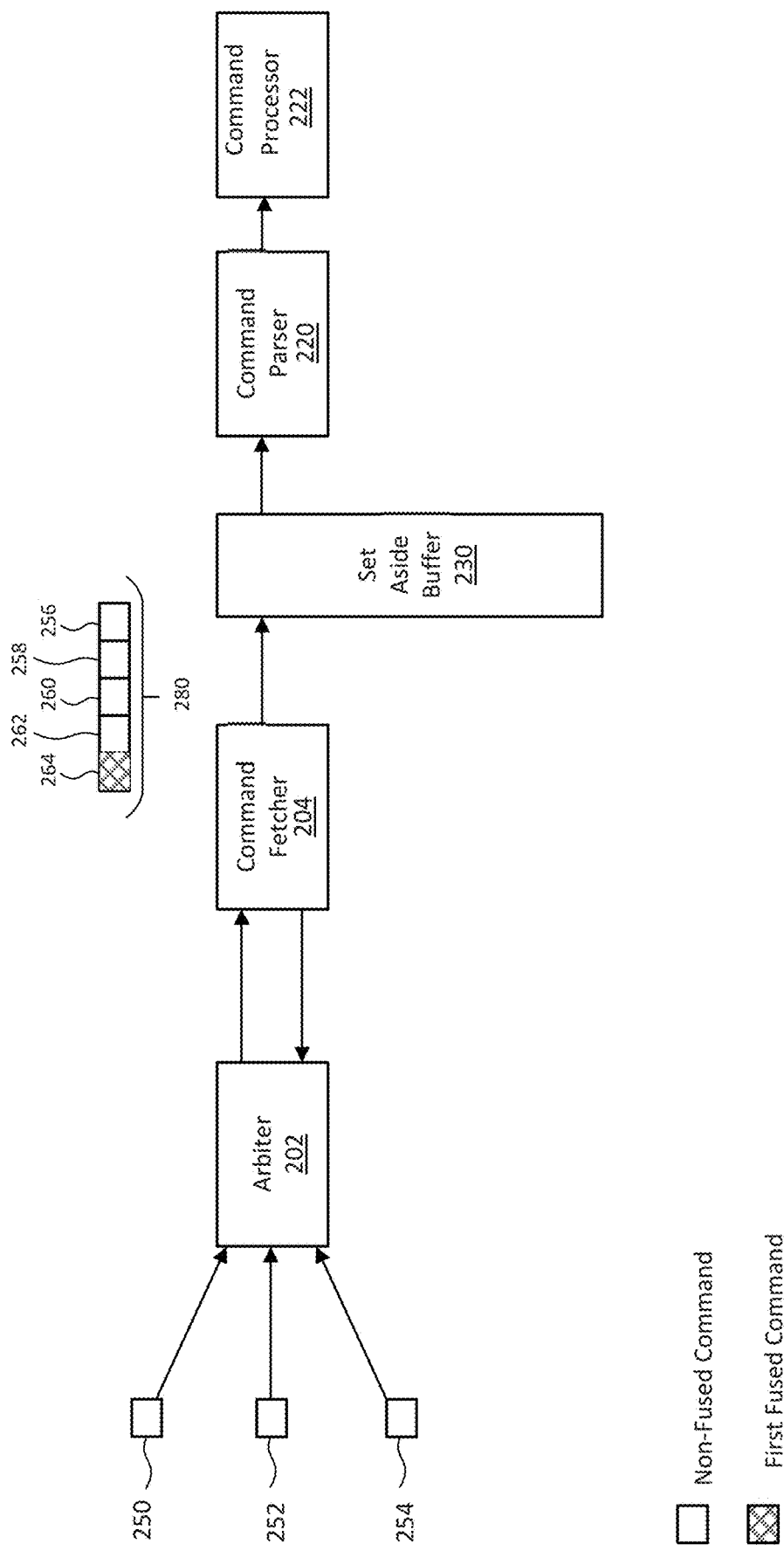
FIG. 2A is a diagram illustrating a memory device processing a sequence of commands, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices utilizing storage devices and/or NVMe. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1st," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

In a memory system, an arbiter may sequence commands from different sources (i.e., SQs) that are then retrieved by a command fetcher. Specifically, a burst of commands may be selected from each SQ in a specified arbitration manner, and put in the sequence of commands. However, in some instances, fused commands, which are from the same input source and are flagged to be processed atomically, may be separated in the sequence with other commands therebetween. For example, this may occur when a first fused command from a pair of fused commands is a last command in a burst from a given SQ, and the second fused command from the pair of fused commands remains on the given SQ. Due to the specified arbitration manner of the arbiter, one or more bursts from other SQs may then be inserted in the sequence before a next burst from the given SQ is retrieved, which includes the second fused command as a first command.

FIG. 1 is a diagram illustrating a memory device. The memory device includes an arbiter 102, a command fetcher 104, a PCI manager 108, a first PCIe Interface (IF) 110, a command parser 120, and a command processor 122, which, embodies a solid state drive, a hard disk drive, another storage device, or combination thereof. In some embodiments, the storage device corresponds to an NVMe device. In other embodiments, the storage device operates according to one or more other storage protocols. The command processor 122 may be represented as processor 620 of FIG. 6 and controller 706 of FIG. 7.

The arbiter 102 receives status information on a plurality of SQs. In the embodiment of FIG. 1, first SQ status information 150, second SQ status information 152, and third SQ status information 154 are provided to the arbiter 102. Different fixed, dynamic fairness, or dynamic weighted priorities may be established among the first, second, and third SQs, and the SQs may be serviced in a weighted round-robin, round-robin, or other arbitration manner. The arbiter 102 determines how many commands are to be fetched from the winning SQ. For example, when a first SQ is the winning SQ, the arbiter determines how many commands are to be fetched from the first SQ based on the first SQ status information 150. The arbiter 102 then commands a command fetcher 104 to retrieve the determined number of commands from the first SQ.

The command fetcher 104 receives the commands from a host memory 116 via a connection through the PCIM 108 having the first PCIe IF 110, and a host bus 114 having a second PCIe IF 112. The PCIe IF 112, the host bus 114, and the host memory 116 embody at least a portion of a host 134.

Accordingly, commands are pulled from a given SQ in command bursts of one or more commands. It is possible for fused commands to be split between two command bursts. For example, for a pair of fused commands, a last command in a first command burst from an SQ may be a first fused command of the pair of fused commands, while a second fused command of the pair of fused commands is in a second command burst from the same SQ. If the arbiter 102 next pulls commands from a different SQ after the first burst, the first and second fused commands would be split, with at least the commands of the different SQ therebetween.

Since the arbiter 102 does not know the content of a command when it performs arbitration, it is not able to arbitrate the winner to the same SQ when split fused commands occur. The command content is only available after the command fetcher 104 performs the fetching operation through long latency PCIe access. The long latency from the fetch request to fetch return becomes the critical path, or bottleneck, of processing speed of the system.

The second fused command must be paired with the first fused command. Therefore, a command burst is checked to determine if it has a split fused command. For example, if a first fused command is the last command of a command burst, a second fused command may be fetched from a same SQ. The first and second fused commands of the pair of fused commands are then provided to the command parser 120 and the command processor 122 for atomic processing.

Accordingly, the command fetcher 104 may be required to cease retrieving and processing other commands until the second fused command is received, slowing drive operation. The drive operates more efficiently when commands are able to be fetched from the various SQs in bursts, and the fetching from the various SQs is scheduled by the arbiter 102 in advance.

An embodiment of the present disclosure provides a set-aside buffer connected to the command fetcher. The controller identifies a last command in a command burst as a fused command from a split set of fused commands. In response to identifying the fused command, the command fetcher stores the fused command on the set-aside buffer with an input source identifier (e.g., an identifier of the corresponding SQ). The processing of commands that are received after the fused command, but before a remainder of the set of fused commands, is minimally or not interrupted. When another fused command is identified, the controller determines whether the other fused command corresponds to the first fused command stored on the set-aside buffer using the input source identifiers of both fused commands. Fused commands have identical input source identifiers when they originate from the same SQ. When the other fused command corresponds to the first fused command stored on the set-aside buffer and completes the set of fused commands, the pair of fused commands are sent to be processed atomically. When the other fused command is a first portion of another set of fused commands, the other fused command is also stored on the set-aside buffer When the other fused command is a second portion of a set of fused commands and does not correspond to any stored first fused command, an error handling process is triggered.

FIG. 2A is a diagram illustrating a memory device processing a sequence of commands, according to an embodiment. The memory device includes an arbiter 202, a command fetcher 204, a command parser 220, and a command processor 222, as described above with respect to FIG. 1. The memory device may include other components, but they are omitted for ease of description. In the embodiment of FIG. 2A, a set aside buffer 230 is disposed between the command fetcher 204 and the command parser 220.

The arbiter 202 receives status information on a plurality of SQs. In the embodiment of FIG. 2A, first SQ status information 250, second SQ status information 252, and third SQ status information 254 are provided to the arbiter 202. As described above, the arbiter 202 determines how many commands are to be fetched from a winning SQ, and commands a command fetcher 104 to retrieve the determined number of commands from the winning SQ (e.g., a first SQ). The command fetcher 104 receives the commands from a host memory, as described with respect to FIG. 1. While three SQs are provided in this embodiment, any number of SQs may be utilized in the system.

A first command burst 280 retrieved by the command fetcher 204 includes non-fused commands 256, 258, 260, and 262, and a first fused command 264 of a set of fused commands. Accordingly, a remainder of the set of fused commands remains on the first SQ. While five commands are illustrated in the first command burst 280, a command burst may include any number of one or more commands. Additionally, the arbiter 102 may request any number of commands in a given command burst, and this number may change from one command burst to a next command burst.

Figure 2B:
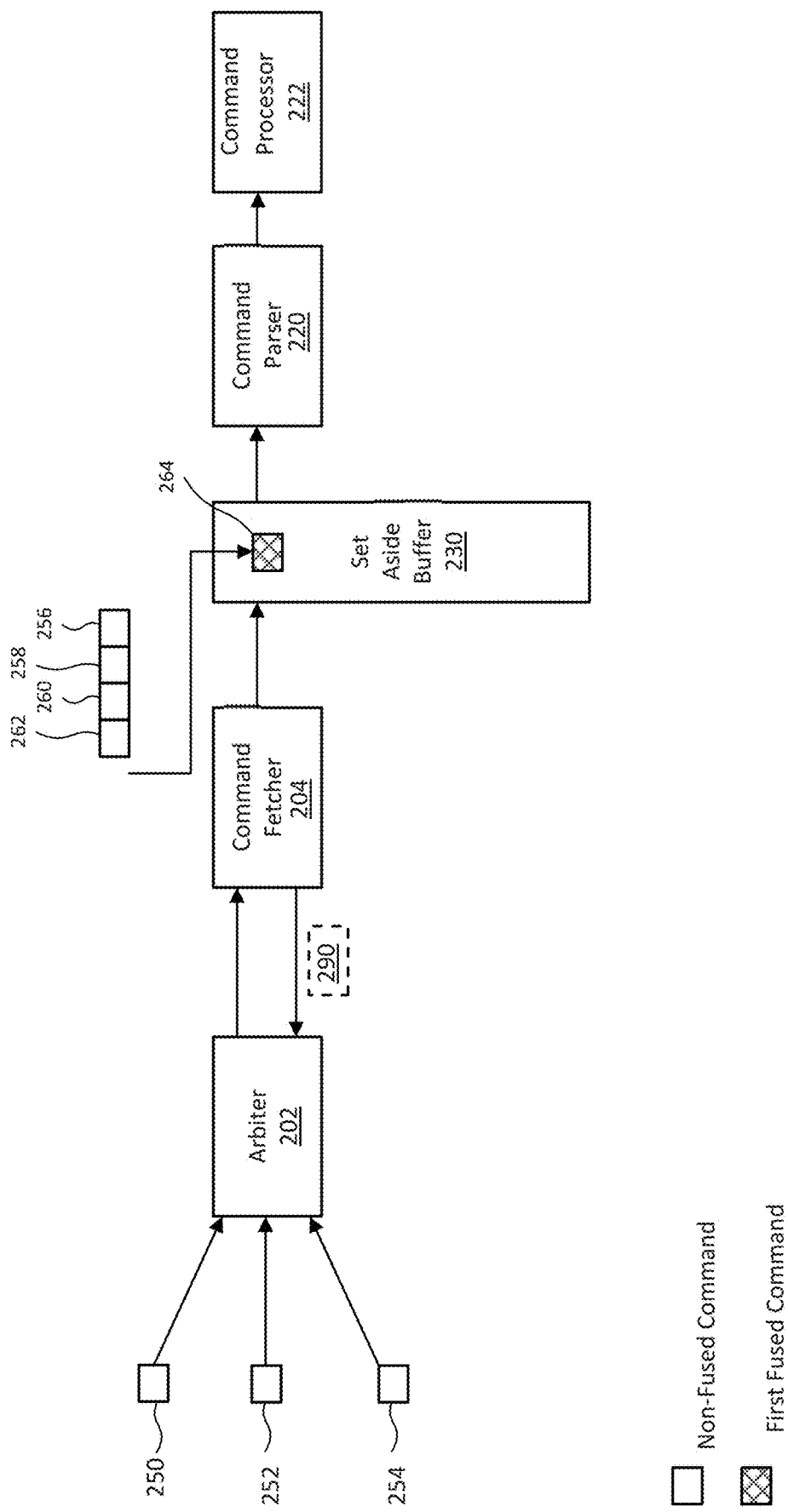
FIG. 2B is a diagram illustrating the memory device of FIG. 2A, according to an embodiment.

FIG. 2B is a diagram illustrating the memory device of FIG. 2A, according to an embodiment. The command fetcher 204 retrieves the first command burst 280, and sends the non-fused commands 256, 258, 260, and 262 to the command parser 220 for processing. The controller identifies the first fused command 264 as being one of a split set of fused commands, and stores the first fused command 264 at the set-aside buffer 230 without processing the first fused command 264. The first fused command may be identified using fused command identifiers that differentiate non-fused from fused commands, and also differentiate fused commands within a set of fused commands.

The arbiter 202 may command the command fetcher 204 to retrieve a second command burst from the second SQ or the third SQ. Since the second command burst is from a different SQ than the first fused command 264, the second command burst does not include the remainder of the split set of fused commands. Instead, the second command burst may include only non-fused commands. In another embodiment, the second command burst may include a full set of fused commands, or a partial set of fused commands from the different SQ, which is described in greater detail below.

Figure 2C:
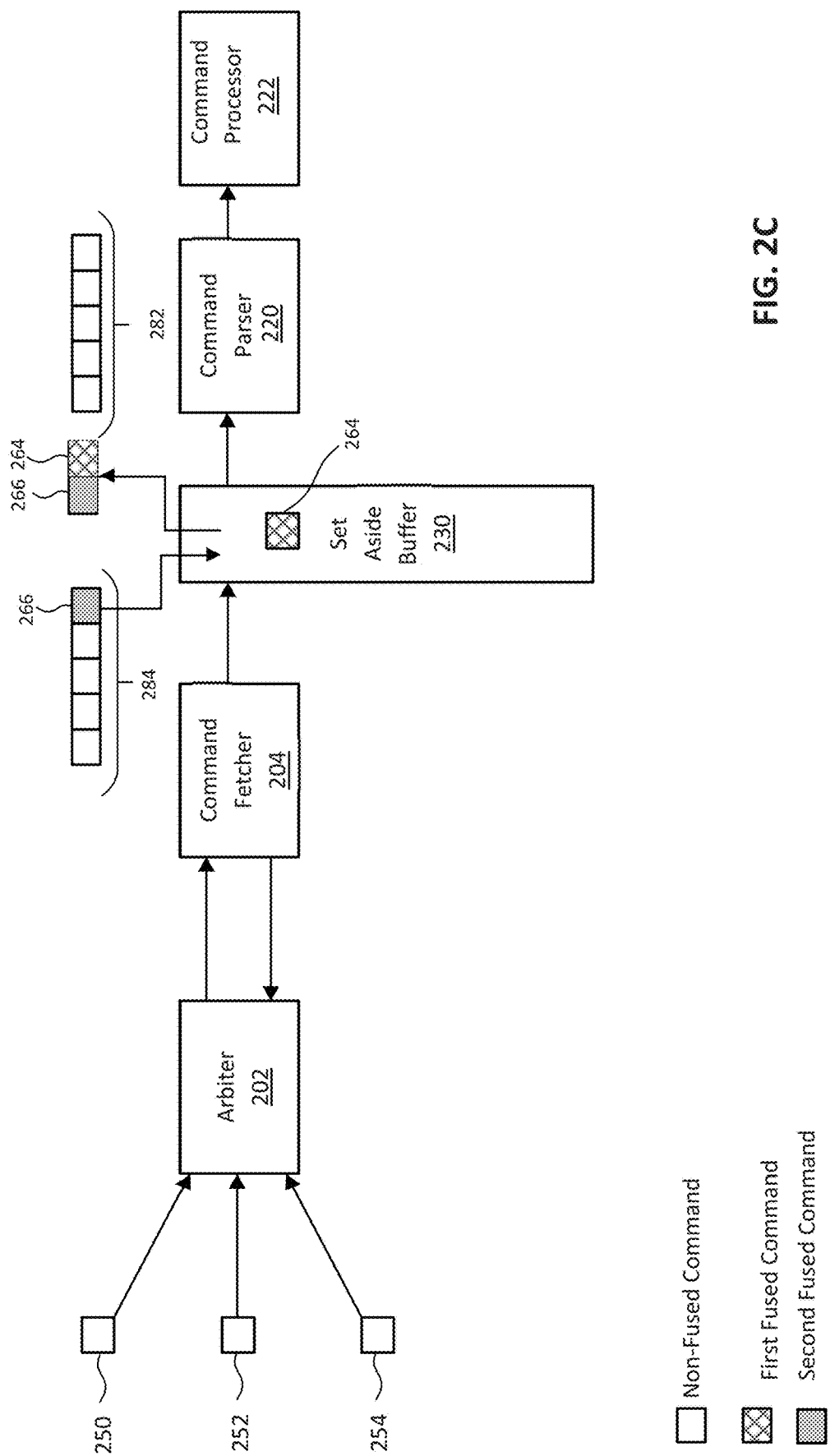
FIG. 2C is a diagram illustrating the memory device of FIGS. 2A and 2B, according to an embodiment.

FIG. 2C is a diagram illustrating the memory device of FIGS. 2A and 2B, according to an embodiment. The command fetcher 204 sends non-fused commands of a second command burst 282 to the command parser 220 for processing, while the first fused command 264 remains in the set-aside buffer 230. When the command fetcher 204 retrieves a third command burst 284 from the first SQ, the controller identifies a first command of the third command burst 284 as a fused command 266. This fused command may be identified using fused command identifiers that differentiate non-fused from fused commands, and also differentiate fused commands within a set of fused commands.

The controller determines whether an identifier of the fused command 266 matches an identifier of any fused command stored in the set-aside buffer (e.g., the first fused command 264). The identifier may be an input source identifier, or more specifically, an identifier of an SQ from which the command originated. In response to determining that the identifiers of the fused command 266 and the first fused command 264 match, the fused command 266 is identified as a remainder of the set of fused commands. The first fused command 264 is pulled from the set-aside buffer 230 for atomic processing with the fused command 266 at the command parser 220 and the command processor 222. The remainder of commands in the third command burst 284 are subsequently processed.

Accordingly, the command fetcher 204 continues to retrieve and process other commands while awaiting reception of the remainder of the set of fused commands, preventing the slowing of drive processing speeds when a pair of fused commands are split between command bursts.

In another embodiment, when the third command burst 284 does not originate from the first SQ, and includes at least one split fused command positioned at an end of the third command burst 284, the identifiers of the at least one fused command and the first fused command 264 will not match. Accordingly, the at least one fused command is stored in the set aside buffer 230 as a part of another set of fused commands. A similar procedure takes place when the second command burst 282 includes at least one split fused command at an end of the second command burst 282. As evidenced by this embodiment, when the set of fused commands includes two fused commands, the set-aside buffer 230 would require enough size to store a fused command from every SQ.

As shown in FIGS. 2A-2C, fused commands are identified and stored in the set-aside buffer 230. According to an embodiment, all fused commands may be identified and provided to the set-aside buffer 230, regardless of their position in the command burst. As described above, a first arriving fused command from a spilt pair of fused commands would be held in the set-aside buffer 230 until a second fused command is received at the set-aside buffer 230. Additionally, non-split pairs of fused commands arriving in a single command burst would be sent to the set-aside buffer 230, immediately matched, and then atomically processed.

In another embodiment, only those split fused commands positioned at an end of a command burst are provided to the set-aside buffer 230. It is then determined whether any subsequently arriving split fused commands positioned at a beginning of a command burst match one or more fused commands in the set-aside buffer 230. In this embodiment, non-split fused commands arriving in the same command burst are atomically processed without being sent to the set-aside buffer 230.

In a further embodiment, when a set of fused commands includes a pair of fused commands, the controller may identify single fused commands in a command burst, regardless of their position in the command burst. The identified single fused commands would be provided to the set-aside buffer 230 for matching. Accordingly, all split fused command pairs would be forwarded to the set-aside buffer 230, while non-split fused command pairs would be atomically processed. More generally, for a set including any number of fused commands, the controller may identify one or more fused commands in a burst that are not part of a complete set of fused commands.

Referring back to FIG. 2B, according to an embodiment, in response to the controller identifying that that the first command burst 280 includes the first fused command 264, the command fetcher 204 may send a top priority request 290 to the arbiter 202 for retrieval of the second fused command 266 of the corresponding pair of fused commands from the first SQ. The first fused command 264 is stored on the set-aside buffer 230. This top priority request 290 may change the selection order of the arbiter, and may minimize the number of bursts that are received between the first fused command 264 and the second fused command 266.

The top priority request 290 may be a request for a single command or for a command burst. For example, the top priority request 290 may result in the reception of the second fused command 266 or the third command burst 284 with the second fused command 266, before the second command burst 282. This embodiment would also decrease the required size of the set-aside buffer 230. Since split fused commands are matched more quickly and in a controlled fashion, the set-aside buffer 230 is not required to have space for a fused command from each of the SQs.

When the top priority request 290 is a request for a single command (i.e., only the second fused command 266, and not a command burst), upon retrieving the single command from the first SQ 250, the arbiter 202 returns to an original priority sequence of SQs for retrieving command bursts.

When the top priority request 290 is not limited to a single command, the top priority request 290 may be marked to alternate between top and low priority SQs. This may result in a greater delay of the second fused command when compared to the request for a single command, but not to the extent of the embodiment without the top priority request 290. Additionally, this may require more space in the set-aside buffer 230 when compared to the request for a single command, but not to the extent of the embodiment without the top priority request 290. However, this embodiment may provide assistance in rectifying the disturbance to the original priority sequence of SQs that was caused by the top priority request 290.

In another embodiment, whether the top priority request 290 is for a single command or is marked to alternate between top and low priority SQs, level arbitration may be added between the arbiter 202 and the top priority request 290.

Generally, in round-robin arbitration, default priority assignments are configured for all inputs, the default priority is adjusted according to a last winner, and a highest priority is selected. When a winner is assigned based on the top priority request 290, that winner is taken into account in the adjustment of the default priorities, thereby changing the arbitration sequence. Therefore, according to an embodiment, the SQ corresponding to the top priority request is not categorized as a "winner", so that the default priorities and arbitration sequence is not changed due to the top priority request. Specifically, the winner prior to the top priority request 290 is used in determining the arbitration sequence going forward.

Figure 3:
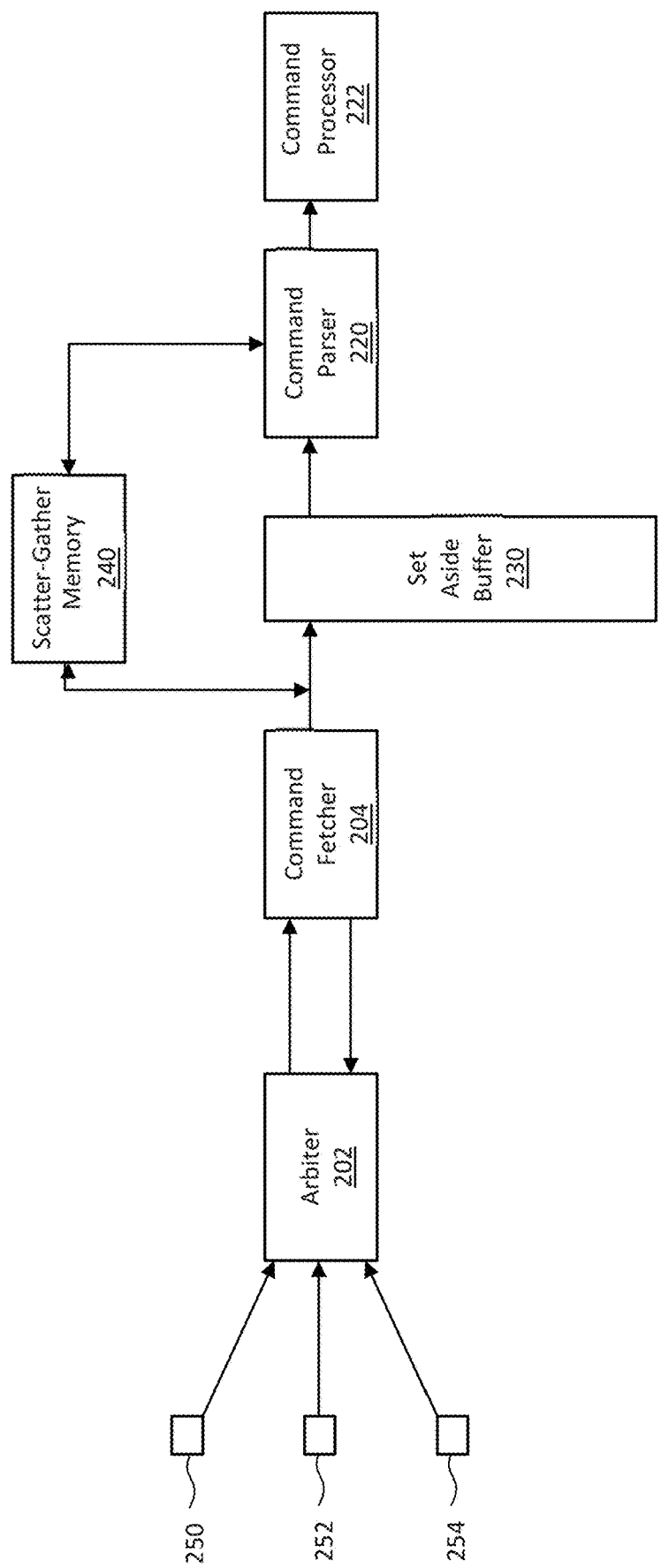
FIG. 3 is a diagram illustrating a memory device, according to another embodiment.

Referring now to FIG. 3, a diagram illustrates a memory device, according to another embodiment. An existing shared scatter-gather memory 240 of the memory device is connected between the command fetcher 204 and the set-aside buffer 230, and also connected to the command parser 220. The scatter-gather memory 240 is not shown in FIGS. 2A-2C for ease of description. The scatter-gather memory 240 is used to store both non-fused and fused commands prior to processing at the command parser 220. The set-aside buffer 230 stores only the identifiers, or input source identifiers, of the fused commands. Non-fused commands and complete sets of fused commands are continually processed, and the matching procedure of split fused commands is similar that described above with respect to FIGS. 2A-2C. However, when a match is identified at the set-aside buffer 230, the corresponding fused commands are retrieved from the scatter-gather memory 240 for atomic processing at the command parser 220. Since only identifiers of the fused commands are provided to the set-aside buffer 230, the size of the set-aside buffer 230 may be reduced from that required in the embodiment of FIGS. 2A-2C. Additionally, since the scatter-gather memory 240 is an already existing component, the additional memory that is required for this embodiment is decreased.

Figure 4:
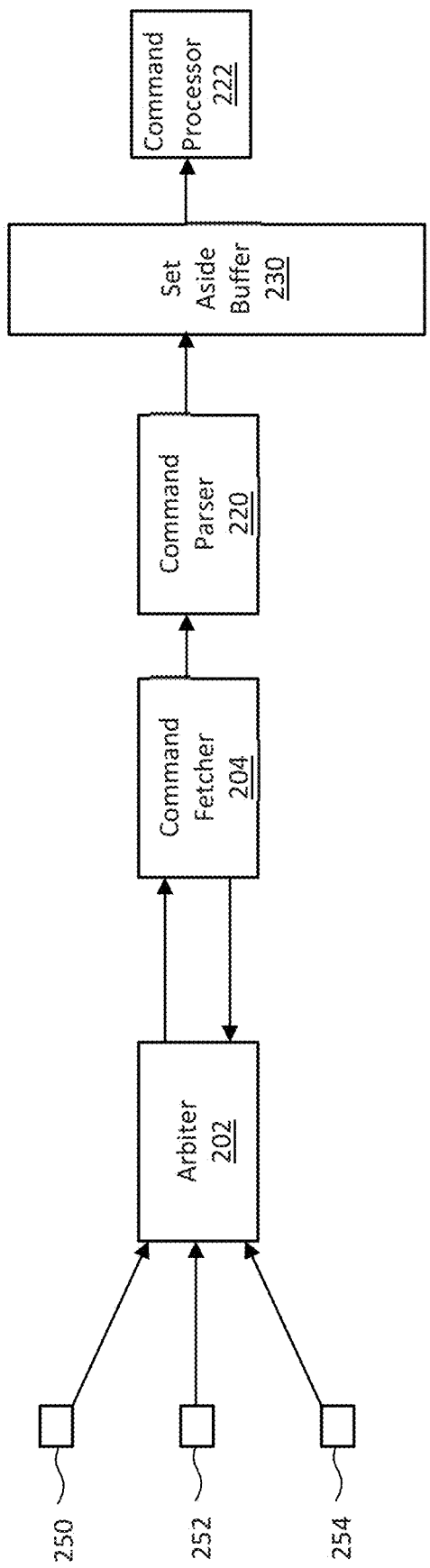
FIG. 4 is a diagram illustrating a memory device, according to another embodiment.

FIG. 4 is a diagram illustrating a memory device, according to another embodiment. The set aside buffer 230 may be positioned between the command parser 220 and the controller 222. In this embodiment, the command parser 220 performs the identification and determination steps taken by the command fetcher 204 in the embodiment of FIGS. 2A-2C. In accordance with embodiments of the disclosure, any number of blocks may exist in the memory device processing pipeline between the command fetcher 204 and the command processor 222. For example, the memory device processing pipeline may include multiple-stage command parsers. The placement of the set-aside buffer is not limited to that shown in FIGS. 2A-2C, 3, and 4, and the set-aside buffer 230 may be disposed anywhere between the command fetcher 204 and the command processor 222.

Figure 5:
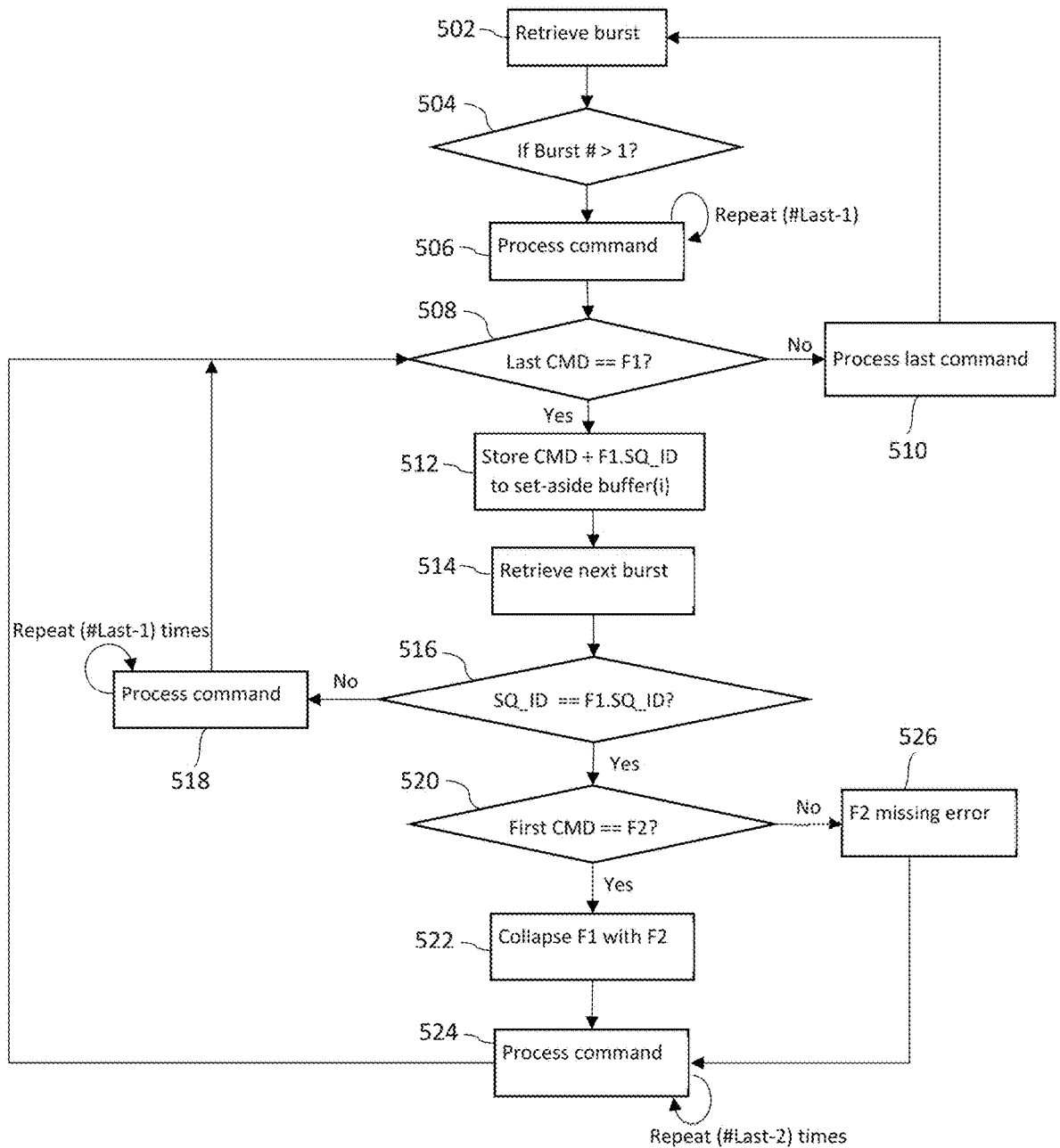
FIG. 5 is a flowchart illustrating a method of operating a memory device, according to an embodiment.

FIG. 5 is a flowchart illustrating a method of operating a memory device, according to an embodiment. Any of the components or any combination of the components described (i.e., in the device diagrams) can be used to perform one or more of the operations of the flowchart. The operations depicted in the flowchart are exemplary operations and may involve various additional steps not explicitly provided in the flowchart. The order of the operations depicted in the flowchart is exemplary and not exclusive, as the order may vary depending on the implementation.

At 502, a controller of the memory device retrieves a first command burst from a host memory. The first command burst includes a sequence of commands from a first SQ. The controller may be embodied as at least a combination of the arbiter 202, the command fetcher 204, the set-aside buffer 230, the command parser 220, and the command processor 222 of FIG. 1. The controller may also be embodied as the processor 620 of FIG. 6 and the controller 706 of FIG. 7.

At 504, the controller continues if the retrieved command burst includes more than one command. For example, the retrieved command burst may include five commands as illustrated in FIGS. 2A-2C. While it is possible to retrieve individual commands, generally, when a memory device is designed to process pairs of fused commands, the commands are retrieved in bursts of at least two commands.

At 506, the controller processes a command from the retrieved command burst. The controller may process the commands of the retrieved command burst in an order beginning with a first command. The controller repeats processing for each command in the retrieved command burst until reaching a last command in the retrieved command burst. Specifically, as shown in FIG. 5, processing is repeated for each command in the retrieved command burst through a (last-1) command. The processed commands may include non-fused commands and/or complete pairs or sets of fused commands in the retrieved command burst.

At 508, the controller determines whether a last command in the retrieved command burst is a first fused command of a pair of fused commands. The pair of fused commands is to be processed atomically in the memory device, as described above. However, when a first fused command is the last command of a command burst, the pair is split and a second fused command of the pair of fused commands remains on the first SQ. The first fused command may be identified by a fused command identifier that differentiates non-fused commands from fused commands, and also differentiates first and second fused commands within a pair fused commands.

In response to determining that the last command of the retrieved command burst is not a first fused command, the controller processes the last command at 510, thereby completing processing of all commands in the retrieved command burst. The controller returns to 502 for retrieval of another command burst.

In response to determining that the last command of the retrieved command burst is a first fused command of a pair of fused commands, the controller stores the first fused command, and an SQ identifier of the first fused command, in a set-aside buffer of the memory device, at 512. The set-aside buffer(i) may correspond to the SQ from which the command burst is received, and i may have a value from 1 to a maximum number of SQs, or from 1 to a maximum number of buffers (with feedback request).

Alternatively, the controller may only store the SQ identifier of the first fused command in the set-aside buffer of the memory device. The first fused command is then stored on an existing shared scatter-gather memory of the memory device, as described above with respect to FIG. 3.

The pair of fused commands may alternatively be a set of fused commands having three or more commands. For example, for a set of fused commands having three fused commands, the last one or two commands of the retrieved command burst may be fused commands from a split set of fused commands. Accordingly, the processing of commands would repeat until a penultimate command of the command burst is reached, at 506. The controller would then determine whether the last command or both the last command and the penultimate command are fused commands from a split set of fused commands.

This determination may be performed using the fused command identifiers described above, which would also distinguish a last command within the set of fused commands (e.g., last of the atomicity). This identifier may be provided by the host. Further, this determination may be performed using an identifier that indicates a split point in the set of fused commands. For example, the last command in the command burst may include an identifier indicating a split point, which identifies the last command and any immediately preceding fused commands as fused commands from a split set of fused commands. Thus, two or more fused commands at the end of the command burst that are determined to be from a split set of commands, are stored on the set-aside buffer.

Additionally, with respect to sets having three or more commands, it may be possible for a set of fused commands to split across more than two command bursts. For example, when a command burst size is two and the set of fused commands is four, a first fused command may be included as a last command of a first command burst, second and third fused commands may be included in a second command burst, and a fourth fused command may be included as a first command of a third command burst. The fused commands may be identified and differentiated, and the split points may be identified, using the identifiers described above. Since three separate command fetch operations are performed before fused commands can be collapsed, the set-aside buffer may utilize a link list to chain the stored fused commands together prior to collapsing the fused commands together and atomically processing by the memory device. This may require expansion of the set-aside buffer and existing memories (e.g., scatter-gather).

Referring back to FIG. 5, at 514, the controller retrieves a next command burst from the host memory. The next command burst includes a sequence of commands from an SQ. Specifically, this next command burst may be from the first SQ or from another SQ.

At 516, the controller determines whether an SQ identifier of the next command burst (SQ_ID) is the same as the stored SQ identifier of the first fused command (F1.SQ_ID). Specifically, the controller determines whether this next command burst originates from the same SQ as the first fused command.

In response to determining that the SQ identifier of the next command burst is not the same as the stored SQ identifier of the first fused command, the controller processes a command from the next command burst, at 518. Specifically, this determination would indicate that this next command burst is from a different SQ than that of the first fused command.

The controller may process the commands of the retrieved command burst in an order beginning with a first command, and repeat processing for each command until reaching a last command, as previously described with respect to 506. The processed commands may include non-fused commands and/or complete pairs or sets of fused commands in the command burst. The controller then returns to 508 to determine whether a last command of the command burst is a first fused command of a pair of fused commands from this other SQ. For a command burst from the other SQ having a first fused command as a last command, the command and SQ identifier may be stored in a different set-aside buffer.

In response to determining that the SQ identifier of the next command burst is the same as the stored SQ identifier of the first fused command, the controller determines whether a first command of the next command burst is a second fused command of a pair of fused commands, at 520.

The second fused command may be identified by a fused command identifier that differentiates non-fused commands from fused commands, and also differentiates first and second fused commands within a pair fused commands.

In response to determining that the first command of the next command burst is a second fused command, the controller collapses the stored first fused command and the newly received second fused command for atomic processing, at 522. Since the command burst was identified as coming from the same SQ as the stored first fused command, and since the first command of the command burst was identified as a second fused command, the first fused command must be the second fused command of the pair of fused commands corresponding to the stored first fused command.

At 524, the controller processes remaining commands up to a last command in the command burst. The controller may process the commands of the retrieved command burst in an order beginning with a second command, and repeat processing for each command until reaching a last command, as previously described with respect to 506. The processed commands may include non-fused commands and/or complete pairs or sets of fused commands in the command burst. The controller then returns to 508 to determine whether a last command of the command burst is a first fused command of a pair of fused commands.

In response to determining that the first command of the retrieved command burst is not the second fused command of the pair of fused commands, an error report is issued that the second fused command of the pair of fused commands is missing, at 526. Specifically, since the command burst is identified as coming from the same SQ as the stored first fused command, if the first command is not the corresponding second fused command, the second fused command is missing and an error report is issued.

The method described in the flowchart of FIG. 5 may occur concurrently for several SQs.

Figure 6:
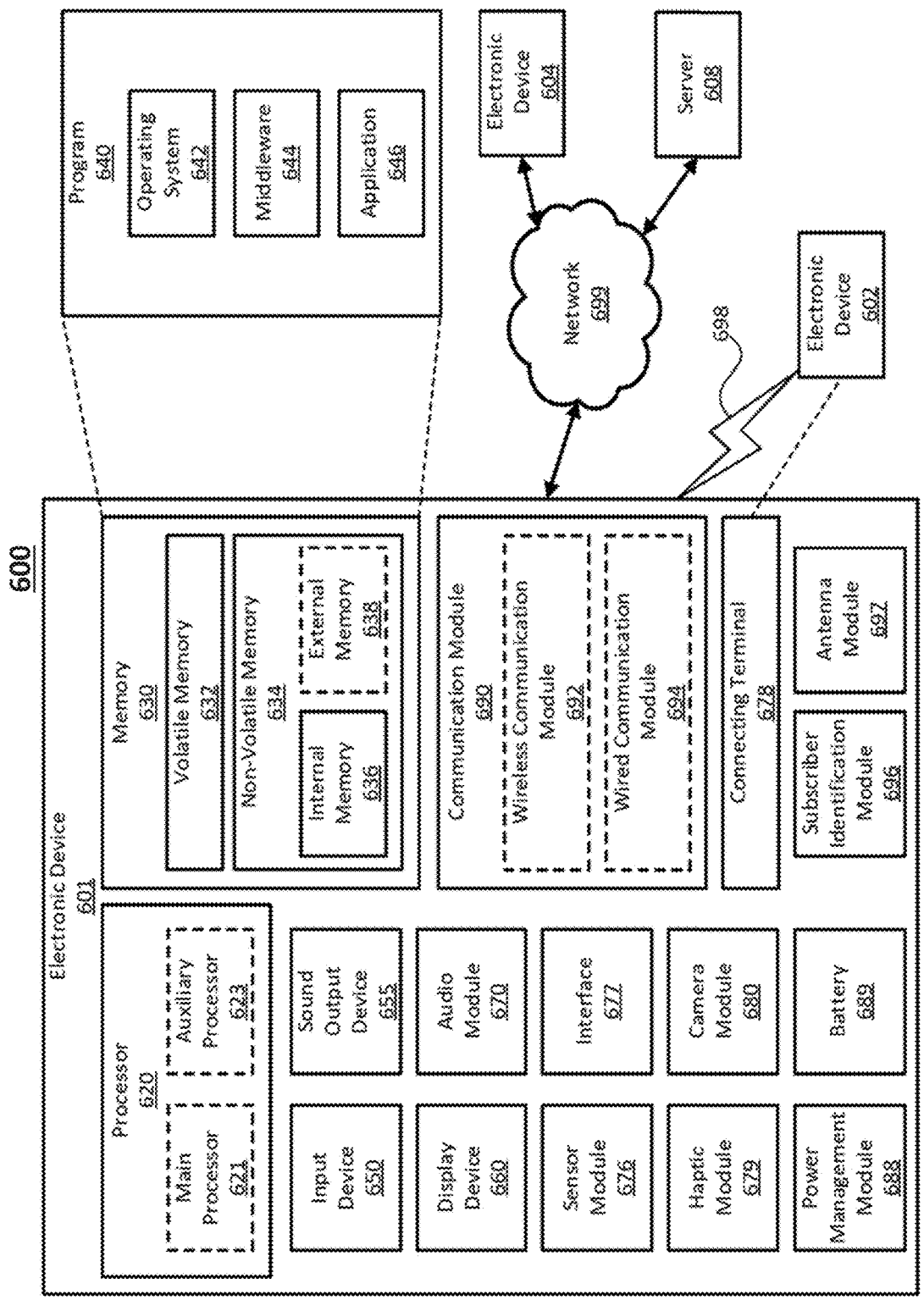
FIG. 6 illustrates a block diagram of an electronic device in a network environment, according to one embodiment.

FIG. 6 illustrates a block diagram of an electronic device 601 in a network environment 600, according to one embodiment. Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. The processor may correspond to command processor 222 of FIGS. 2A-2C, or the combination of the arbiter 202, the command fetcher 204, the set-aside buffer 230, the command parser 220, and the command processor 222 of FIGS. 2A-2C. As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a CPU or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. The power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor of the electronic device 601 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 7:
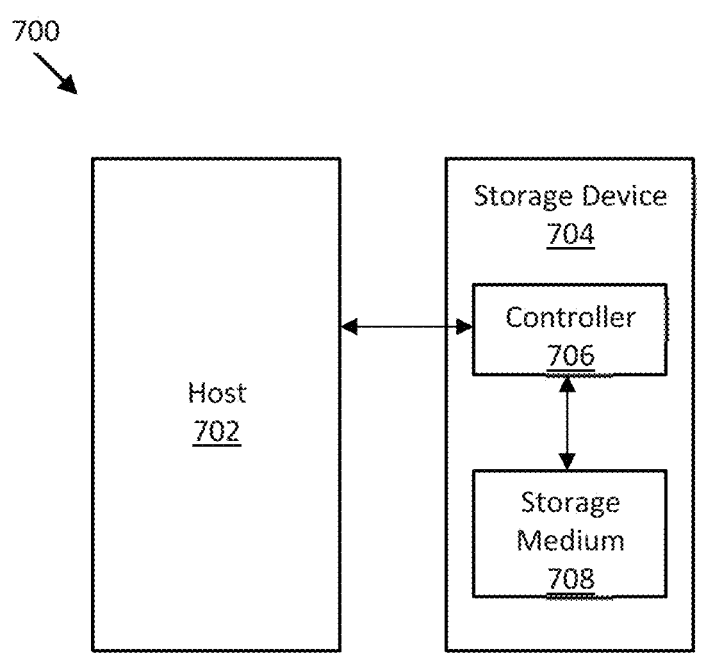
FIG. 7 illustrates a diagram of a storage system, according to an embodiment.

FIG. 7 illustrates a diagram of a storage system 700, according to an embodiment. The storage system 700 includes a host 702 and a storage device 704. The host may correspond to the host 134 of FIG. 1. Although one host and one storage device is depicted, the storage system 700 may include multiple hosts and/or multiple storage devices. The storage device 704 may be a solid state device (SSD), a universal flash storage (UFS), etc. The storage device 704 includes a controller 706 and a storage medium 708 connected to the controller 706. The processor may correspond to the command processor 222 of FIGS. 2A-2C, or the combination of the arbiter 202, the command fetcher 204, the set-aside buffer 230, the command parser 220, and the command processor 222 of FIGS. 2A-2C. The controller 706 may be an SSD controller, a UFS controller, etc. The storage medium 708 may include a volatile memory, a non-volatile memory, or both, and may include one or more flash memory chips (or other storage media). The controller 706 may include one or more processors, one or more error correction circuits, one or more field programmable gate arrays (FPGAs), one or more host interfaces, one or more flash bus interfaces, etc., or a combination thereof. The controller 706 may be configured to facilitate transfer of data/commands between the host 702 and the storage medium 708. The host 702 sends data/commands to the storage device 704 to be received by the controller 706 and processed in conjunction with the storage medium 708. As described herein, the methods, processes and algorithms may be implemented on a storage device controller, such as controller 706. The arbiters, command fetchers, and command processors may be implemented in the controller 706 of the storage device 704, and the processors and buffers may be implemented in the host 702.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a memory device, comprising:
   retrieving, by a controller of the memory device, a first command burst from a host memory, the first command burst comprising a sequence of one or more commands from a first submission queue;
   identifying, by the controller, that at least one command in the first command burst is at least one first fused command of a first set of fused commands, wherein the first set of fused commands is to be processed atomically in the memory device, and a remainder of the first set of fused commands is on the first submission queue;
   storing, by the controller, at least an identifier of the at least one first fused command in a set-aside buffer of the memory device; and
   determining, by the controller, whether the remainder of the first set of fused commands is retrieved by comparing at least a fused command identifier of the at least one first fused command to a fused command identifier of one or more subsequently retrieved commands.

2. The method of claim 1, further comprising:
   retrieving, by the controller, a next command burst from the host memory,
   wherein determining whether the remainder of the first set of fused commands is retrieved comprises determining, by the controller, whether the next burst comprises the remainder of the first set of fused commands.

3. The method of claim 2, wherein:
   determining whether the next command burst comprises the remainder of the first set of fused commands comprises comparing identifiers of the at least one first fused command and one or more commands of the next command burst; and
   the identifiers comprise input source identifiers and the fused command identifiers, wherein the fused command identifiers differentiate individual fused commands, identify a last fused command, or identify a split point within a set of fused commands, and the at least one fused command and the remainder of the first set of fused commands have identical input source identifiers.

4. The method of claim 2, wherein:
   storing at least the identifier of the at least one first fused command in a set-aside buffer comprises storing the identifier and the at least one first fused command in the set-aside buffer; and
   the next command burst comprises the remainder of the first set of fused commands, and further comprising:
      atomically processing the at least one first fused command from the set-aside buffer and the remainder of the first set of fused commands; and
      processing remaining commands of the next command burst.

5. The method of claim 2, wherein:
   storing at least the identifier of the at least one first fused command in a set-aside buffer comprises storing the identifier and the at least one first fused command in the set-aside buffer;
   the next command burst does not comprise the remainder of the first set of fused commands, and further comprising determining, by the controller, whether the next command burst comprises at least one fused command of a second set of fused commands from a second submission queue, wherein a remainder of the second set of fused commands is on the second submission queue; and
   the next command burst comprises the at least one fused command of the second set of fused commands, and further comprising:
      storing an identifier of the at least one fused command and the at least one fused command in the set-aside buffer; and
      processing remaining commands from the next command burst.

6. The method of claim 2, wherein:
   storing at least the identifier of the at least one first fused command in a set-aside buffer comprises storing the identifier of the at least one first fused command in the set-aside buffer and storing the at least one first fused command in a scatter-gather memory of the memory device; and
   the next command burst comprises the remainder of the first set of fused commands, and further comprising:
      atomically processing the at least one first fused command from the scatter-gather memory and the remainder of the first set of fused commands; and
      processing remaining commands of the next command burst.

7. The method of claim 2, wherein:
   storing at least the identifier of the at least one first fused command in a set-aside buffer comprises storing the identifier of the at least one first fused command in the set-aside buffer and storing the at least one first fused command in a scatter-gather memory of the memory device;
   the next command burst does not comprise the remainder of the first set of fused commands, and further comprising determining, by the controller, whether the next command burst comprises at least one fused command of a second set of fused commands from a second submission queue, wherein a remainder of the second set of fused commands is on the second submission queue; and
   the next command burst comprises the at least one fused command of the second set of fused commands, and further comprising:
      storing an identifier of the at least one fused command in the set-aside buffer;
      storing the at least one fused command in the scatter-gather memory; and
      processing remaining commands from the next command burst.

8. The method of claim 1, further comprising:
in response to identifying that the at least one command in the first command burst is the at least one first fused command, sending a top priority request to an arbiter of the memory device for retrieval of the remainder of the first set of fused commands from the first submission queue; and
retrieving, by the controller, only the remainder of the first set of fused commands from the first submission queue, in response to the top priority request.

9. The method of claim 1, further comprising:
in response to identifying that the at least one command in the first command burst is the at least one first fused command, sending a top priority request to an arbiter of the memory device for retrieval of the remainder of the first set of fused commands from the first submission queue;
retrieving, by the controller, a next control burst from the first submission queue, in response to the top priority request, wherein the remainder of the first set of fused commands is a beginning portion of the next control burst; and
adjusting, by the arbiter, a sequence in which submission queues provide command bursts in the memory device to compensate for the first submission queue providing the next control burst out of sequence.

10. A memory device, comprising:
a controller having at least an arbiter, a command fetcher connected to the arbiter, a set-aside buffer, a command parser, and a command processor,
wherein the controller is configured to:
retrieve a first command burst from a host memory, the first command burst comprising a sequence of one or more commands from a first submission queue;
identify that at least one command in the first command burst is at least one first fused command of a first set of fused commands, wherein the first set of fused commands is to be processed atomically in the memory device, and a remainder of the first set of fused commands is on the first submission queue;
store at least an identifier of the at least one first fused command in the set-aside buffer; and
determine whether the remainder of the first set of fused commands is retrieved by comparing at least a fused command identifier of the at least one first fused command to a fused command identifier of one or more subsequently retrieved commands.

11. The memory device of claim 10, wherein:
the controller is further configured to retrieve a next command burst from the host memory; and
in determining whether the remainder of the first set of fused commands is retrieved, the controller is configured to determine whether the next command burst comprises the remainder of the first set of fused commands.

12. The memory device of claim 11, wherein:
in determining whether the next command burst comprises the remainder of the first set of fused commands, the controller is further configured to compare identifiers of the at least one first fused command and one or more commands of the next command burst; and
the identifiers comprise at least one of input source identifiers and the fused command identifiers, wherein the fused command identifiers differentiate individual fused commands, identify a last fused command, or identify a split point within a set of fused commands, and the at least one fused command and the remainder of the first set of fused commands have identical input source identifiers.

13. The memory device of claim 11, wherein:
in storing at least the identifier of the at least one first fused command in a set-aside buffer, the controller is further configured to store the identifier and the at least one first fused command in the set-aside buffer; and
the next command burst comprises the remainder of the first set of fused commands, and the controller is further configured to:
atomically process the at least one first fused command from the set-aside buffer and the remainder of the first set of fused commands; and
process remaining commands of the next command burst.

14. The memory device of claim 11, wherein:
in storing at least the identifier of the at least one first fused command in a set-aside buffer, the controller is further configured to store the identifier and the at least one first fused command in the set-aside buffer;
the next command burst does not comprise the remainder of the first set of fused commands, and the controller is further configured to determine whether the next command burst comprises at least one fused command of a second set of fused commands from a second submission queue, wherein a remainder of the second set of fused commands is on the second submission queue; and
the next command burst comprises the at least one fused command of the second set of fused commands, and the controller is further configured to:
store an identifier of the at least one fused command and the at least one fused command in the set-aside buffer; and
process remaining commands from the next command burst.

15. The memory device of claim 11, wherein:
in storing at least the identifier of the at least one first fused command in a set-aside buffer, the controller is further configured to store the identifier of the at least one first fused command in the set-aside buffer and store the at least one first fused command in a scatter-gather memory of the memory device; and
the next command burst comprises the remainder of the first set of fused commands, and the controller is further configured to:
atomically process the at least one first fused command from the scatter-gather memory and the remainder of the first set of fused commands; and
process remaining commands of the next command burst.

16. The memory device of claim 11, wherein:
in storing at least the identifier of the at least one first fused command in a set-aside buffer, the controller is further configured to store the identifier of the at least one first fused command in the set-aside buffer and store the at least one first fused command in a scatter-gather memory of the memory device;
the next command burst does not comprise the remainder of the first set of fused commands, and the controller is further configured to determine whether the next command burst comprises at least one fused command of a second set of fused commands from a second submission queue, wherein a remainder of the second set of fused commands is on the second submission queue; and the next command burst comprises the at least one fused command of the second set of fused commands, and the controller is further configured to:
  store an identifier of the at least one fused command in the set-aside buffer;
  store the at least one fused command in the scatter-gather memory; and
  process remaining commands from the next command burst.

17. The memory device of claim 10, wherein the set-aside buffer is disposed between the command fetcher and the command processor in the processing pipeline of the memory device.

18. The memory device of claim 10, wherein the controller is further configured to:
  in response to identifying that the at least one command in the first command burst is the at least one first fused command, send a top priority request to the arbiter for retrieval of the remainder of the first set of fused commands from the first submission queue; and
  retrieve only the remainder of the first set of fused commands from the first submission queue, in response to the top priority request.

19. The memory device of claim 10, wherein the controller is further configured to:
  in response to identifying that the at least one command in the first command burst is the at least one first fused command, send a top priority request to the arbiter for retrieval of the remainder of the first set of fused commands from the first submission queue;
  retrieve a next control burst from the first submission queue, in response to the top priority request, wherein the remainder of the first set of fused commands is a beginning portion of the next control burst; and
  adjust, by the arbiter, a sequence in which submission queues provide command bursts in the memory device to compensate for the first submission queue providing the next control burst out of sequence.

20. A memory device, comprising:
a controller having at least an arbiter, a command fetcher connected to the arbiter, a set-aside buffer, a command parser, and a command processor,
wherein the controller is configured to:
  retrieve a first command burst from a host memory, the first command burst comprising a sequence of commands from a first submission queue;
  identify that a last command in the first command burst is a first fused command of a pair of fused commands, wherein the pair of fused commands comprises the first fused command and a second fused command that are to be processed atomically in the memory device;
  store the first fused command on the set-aside buffer;
  retrieve a second command burst from the host memory;
  determine whether a first command of the second command burst is the second fused command of the pair of fused commands by comparing at least a fused command identifier of the first fused command to a fused command identifier of the first command of the second command burst; and
  atomically processing the pair of fused commands in response to determining that the first command of the second command burst is the second fused command of the pair of fused commands.

* * * * *